US007870194B2

(12) United States Patent
Michel et al.

(10) Patent No.: US 7,870,194 B2
(45) Date of Patent: Jan. 11, 2011

(54) SHARING CALENDAR INFORMATION (75) Inventors: Theodore L. Michel, Bellevue, WA (US); Glenn Frankel, Redmond, WA (US); Can Comertoglu, Redmond, WA (US); Hans Bjordahl, Redmond, WA (US); Brian Tsang, Redmond, WA (US); Ralph Abdo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 11/598,866

(22) Filed: Nov. 14, 2006

(65) Prior Publication Data

US 2008/0115196 A1    May 15, 2008

(51) Int. Cl.
    *G06F 15/16* (2006.01)
(52) U.S. Cl. .................. 709/204; 709/202; 709/205; 709/207; 705/1; 345/853; 345/738
(58) Field of Classification Search ......... 709/201–207, 709/216; 715/853; 705/1; 345/853
    See application file for complete search history.

(56) References Cited

U.S. PATENT DOCUMENTS

| 6,018,343 | A | 1/2000 | Wang et al. ................ 715/733 |
| 6,369,840 | B1 * | 4/2002 | Barnett et al. .............. 715/853 |
| 6,603,489 | B1 * | 8/2003 | Edlund et al. .............. 715/780 |
| 6,604,079 | B1 | 8/2003 | Ruvolo et al. ................ 705/1 |
| 6,823,357 | B1 | 11/2004 | Du et al. .................... 709/203 |
| 2001/0049617 | A1 | 12/2001 | Berenson et al. .............. 705/8 |
| 2002/0078070 | A1 | 6/2002 | Eshelman et al. ........... 707/200 |
| 2002/0154178 | A1 * | 10/2002 | Barnett et al. .............. 345/853 |
| 2003/0154116 | A1 | 8/2003 | Lofton ....................... 705/8 |
| 2004/0044646 | A1 * | 3/2004 | Hullot et al. ................. 707/1 |
| 2004/0122915 | A1 | 6/2004 | Saare et al. ................. 709/218 |
| 2004/0267625 | A1 | 12/2004 | Feng et al. .................. 705/26 |
| 2005/0027805 | A1 * | 2/2005 | Aoki ......................... 709/206 |
| 2005/0278641 | A1 | 12/2005 | Mansour et al. ............. 715/749 |
| 2006/0045029 | A1 * | 3/2006 | Ethier et al. ................ 370/260 |
| 2006/0282272 | A1 * | 12/2006 | Urasaki et al. ............... 705/1 |
| 2007/0129986 | A1 * | 6/2007 | Barnett et al. ................ 705/8 |
| 2007/0162646 | A1 * | 7/2007 | Maitland et al. ............. 710/22 |

(Continued)

OTHER PUBLICATIONS

Dusseault, Lisa; Whitehead, Jim, "Open Calendar Sharing and Scheduling With CalDAV," IEEE Computer Society, Mar./Apr. 2005, pp. 81-89. http://ieeexplore.ieee.org/ie15/4236/30490/01405979.pdf?tp=&arnumber=1405979&isnumber=30490.

(Continued)

*Primary Examiner*—Wing F Chan
*Assistant Examiner*—Razu A Miah
(74) *Attorney, Agent, or Firm*—Merchant & Gould P.C.

(57) ABSTRACT

Sharing calendar information may be provided. Calendar information may be shared with individuals that may or may not be associated with a local exchange server in order to coordinate schedules. A determination is conducted to decide whether a sender is authorized to send calendar information to another by examining registration rights. Next, if the registration rights are valid, input may be received from the sender associated with sending the calendar information to another using one or more entry points. Next, calendar information settings are received from the sender, which are used when sending the calendar information to another. Next, calendar information is published to the Internet based on the calendar information settings established by the sender, and provided to others for viewing.

14 Claims, 9 Drawing Sheets

U.S. PATENT DOCUMENTS

2007/0294370 A1* 12/2007 Fay et al. .................... 709/219
2008/0133641 A1*  6/2008 Gent et al. .................. 709/201

OTHER PUBLICATIONS

Mustacoglu, Ahmet F.; Wu, Wenjun; Fox, Geoffrey, "Internet Calendaring and Scheduling Core Object Specification (Icalendar) Compatible Collaborative Calendar-Service (CCS) Web Service", Community Grids Lab, Indiana University, Bloomington, IN, Department of Computer Science, Indiana University. http://grids.ucs.indiana.edu/tliupages/p;ublications/AhmetFatihMustacoglu_CTS2006, pdf#search=%22Internet%20Calendaring%20and%20Scheduling%20Core%20Object%20Specification%20%22.

"OfficeCalendar for Microsoft Outlook 2.3.2.0", Publisher's Description. http://officecalendar-for-microsoft-outlook.lookout-softward-ltd.qarchive.org/.

* cited by examiner

SHARING CALENDAR INFORMATION

BACKGROUND

Sharing calendar information is a process for sending all or a portion of an individual's calendar to one or more individuals. In some situations, the individual may be required to send calendar information to someone who is not associated with the individual's local email server, for example, a company's exchange server which the individual is an employee. The conventional strategy to address this situation requires an individual to follow a lengthy series of steps to send calendar information to someone that is not associated with the individual's local exchange server. For example, previous calendar software requires a user to first view a calendar and then select "File—Save a Web page . . . " After selecting "File—Save a Web page," the user sets a static time window and picks a file system folder destination. After picking the file system folder destination, the user saves the calendar and attaches the calendar as a calendar file to an email message. After attaching the calendar as a calendar file to an email message, the user sends the email message to one or more recipients, and once the one or more recipients receive the email message, the recipients would subsequently have to unpack the received calendar file and place the calendar file into a folder on their file system to open the calendar file. If the user changes any calendar information after the user sends the email message, the user must send a new email message with the changed calendar information.

In addition, using the conventional strategy to share calendar information may require allowing individuals that are not employees, access to an organization's local exchange server, which raises security issues. Often, the conventional strategy causes problems because the process is tedious, confusing, unsafe, and may not reflect updated calendar information.

In view of the foregoing, there is a need for methods and systems for sharing calendar information more optimally. Furthermore, there is need for sharing calendar information with others who are not associated with a local exchange server without exposing the local exchange server to others who are not currently associated with the local exchange server. It is with respect to these and other considerations that the present invention has been made.

SUMMARY

Sharing calendar information may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Calendar information may be shared with individuals that may or may not be associated with a local exchange server in order to coordinate schedules. A determination is conducted to decide whether a sender is authorized to send calendar information to another by examining registration rights. Next, if the registration rights are valid, input may be received from the sender associated with sending the calendar information to another using one or more entry points. Next, calendar information settings are received from the sender, which are used when sending the calendar information to another. Next, calendar information is published to the Internet based on the calendar information settings established by the sender, and provided to others for viewing.

In accordance with one embodiment, a method is provided for sharing calendar information by determining whether a sender is authorized to send calendar information to another by examining registration rights. If the registration rights are valid, the method also receives input from the sender associated with sending the calendar information to another using one or more entry points. The method receives calendar information settings that are used when sending the calendar information to another. The method also publishes the calendar information to the Internet based on the calendar information settings established by the sender, and provides access to the calendar information to others for viewing.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Sharing calendar information may be provided. Consistent with embodiments of the present invention, a method and system for sharing calendar information is disclosed. Often employees of an organization are required to coordinate tasks with individuals that are not members of their organization. Accordingly, when attempting to establish a meeting date and time, an employee may desire the convenience of sending calendar information from an application, for example, Microsoft Outlook®, operating on their computer. However, providing such calendar information often required giving individuals that are not employees access to the organizations local exchange server, which may compromise the security of the local exchange server. In addition, when sharing calendar information with others, the employee may desire to limit the amount of calendar information that others may view, for example, a particular calendar time frame and particular calendar information details. Accordingly, an embodiment of the invention may provide a user with a method of sharing calendar information without giving server access rights to individuals who are not associated with the employee's organization and sharing calendar information by specifying how much information is sent to individuals who are not associated with the employee's organization.

An embodiment consistent with the invention may include a system for sharing calendar information. The system may comprise a memory storage and a processing unit coupled to the memory storage. The processing unit may be operative to determine whether a sender is authorized to send calendar information to another by examining registration rights. If the registration rights are valid, the system may also receive input from the sender associated with sending the calendar information to another using one or more entry points. The system may receive calendar information settings that are used when sending the calendar information to another. The system may also publish the calendar information to the Internet based on the calendar information settings established by the sender, and may provide access to the calendar information to others for viewing.

Figure 1:
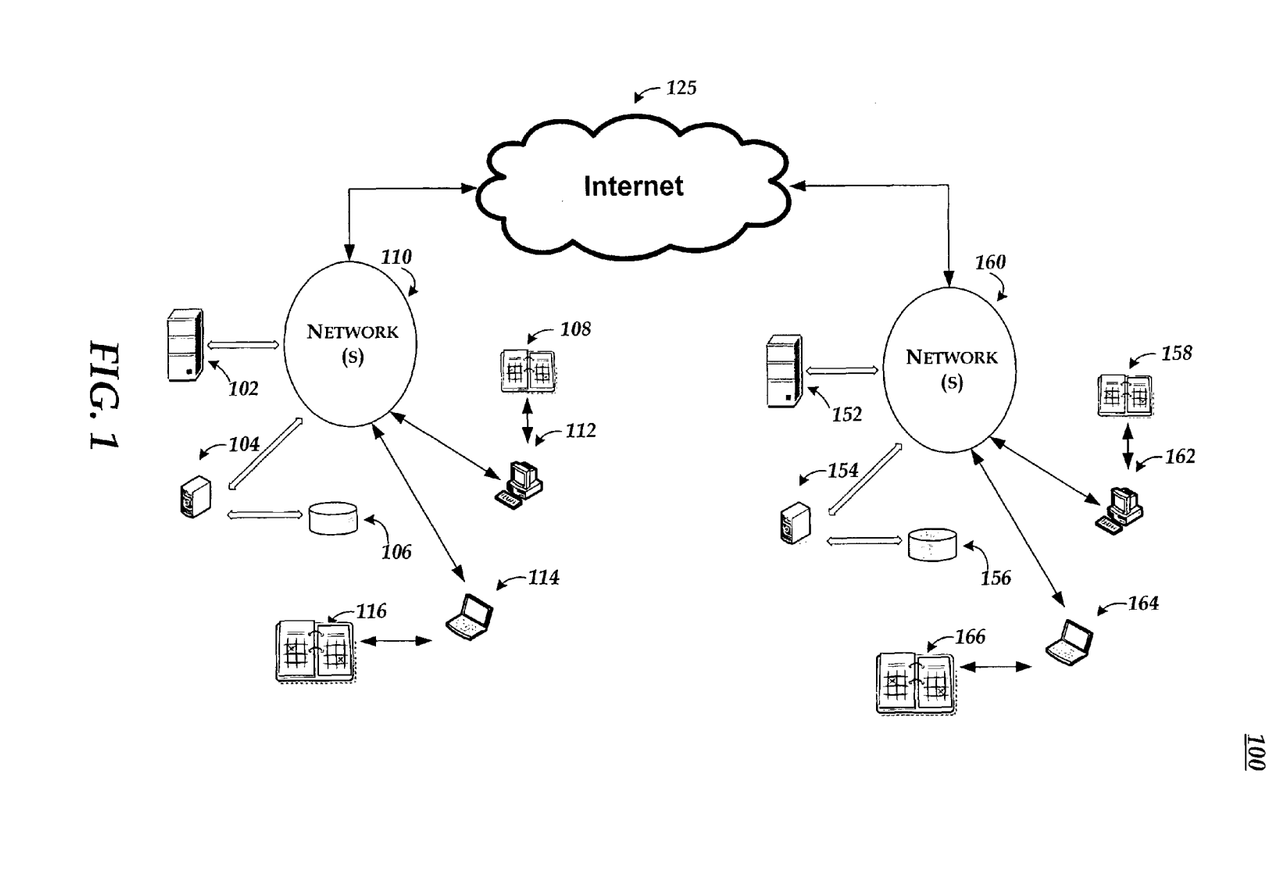
FIG. 1 illustrates a networked operating environment where embodiments may be practiced.

Referring to FIG. 1, a networked system 100 is illustrated where example embodiments may be implemented. Networked system 100 may include a server 102, a server 104 which manages a database 106, a calendar 108 which may be created, edited and displayed using a desktop computer 112, and a laptop computer 114 that may be used to create, edit and display calendar 116. Networked system 100 may include a server 152, a server 154 which manages a database 156, a calendar 158 which may be created, edited and displayed using a desktop computer 162, and a laptop computer 164 that may be used to create, edit and display calendar 166.

Networked system 100 may transmit and receive data to and from other computing devices such as the server 102, the desktop computer 112, and the laptop computer 114. Furthermore, networked environment 100 may transmit or receive data to a storage system 106, which is managed by server 104. Networked system 100 may transmit and receive data to and from other computing devices such as the server 152, the desktop computer 162, and the laptop computer 164. Furthermore, networked system 100 may transmit or receive data to a storage system 156, which is managed by server 154. Other computing devices may participate in the networked system, for example, a thin client connected to the Internet 125.

Computing devices connected to the networked environment 100 may communicate over networks 110 and 160. The networks 110 and 160 may include a secure network such as an enterprise network, or an unsecure network such as a wireless open network. By way of example, and not limitation, the networks 110 and 160 may include wired media such as a wired network or direct-wired connection, and wireless media such as acoustic, RF, infrared and other wireless media. Networks 110 and 160 may be connected to each other over the Internet 125 to facilitate communications between network 110 and network 160.

Figure 2:
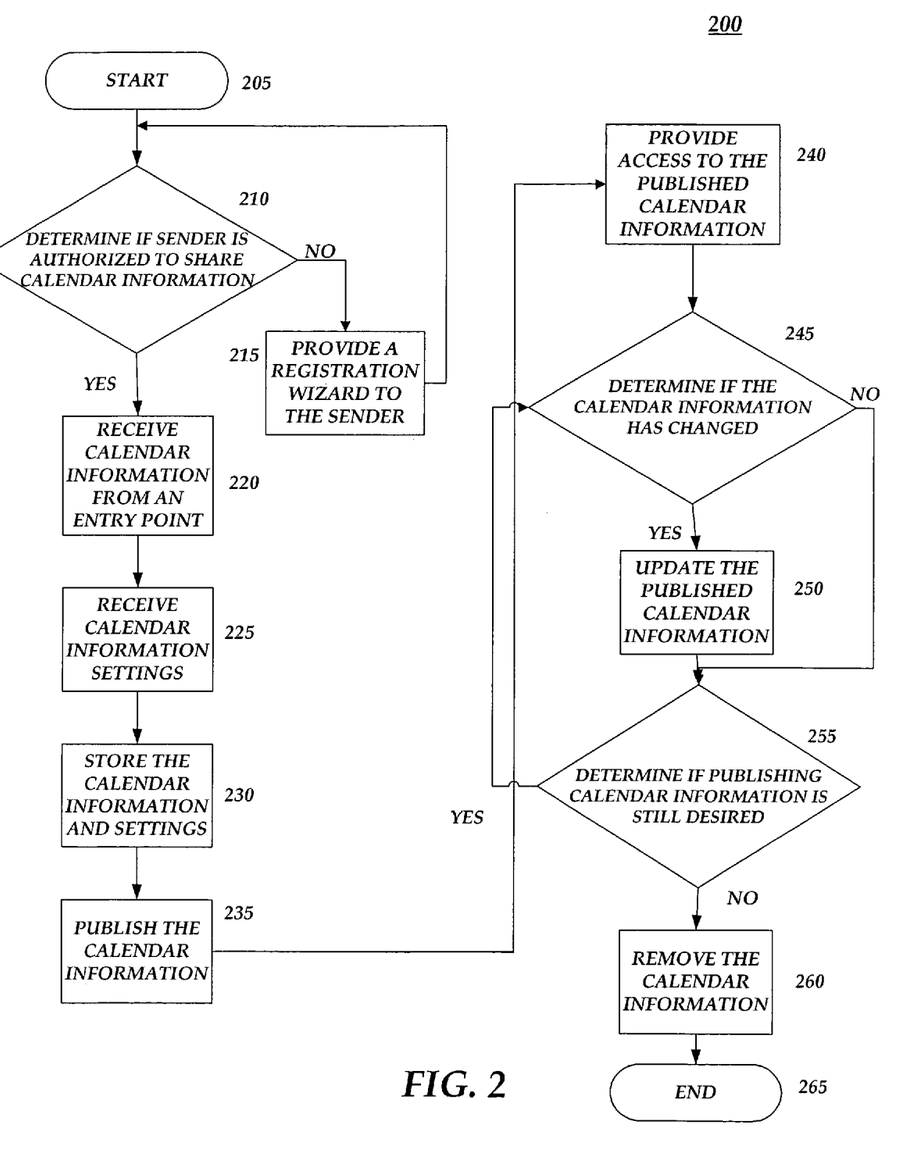
FIG. 2 is a flow chart of a method for sharing calendar information.

FIG. 2 is a flow chart setting forth the general stages involved in a method 200 consistent with an embodiment of the invention for sharing calendar information using a computing device of FIG. 1. Ways to implement the stages of method 200 will be described in greater detail below. Method 200 may begin at starting block 205 and proceed to stage 210 where the computing device may be utilized to determine if a user attempting to share calendar information is authorized to share the calendar information. For example, the user may share their personal calendar information and customized calendar information created by the user. Accordingly, the user may enter login information to verify that the user is authorized to view and send calendar information. For example, the user may be required to enter login information using a web based authentication application, which is further discussed in reference to FIG. 8. Accordingly, the computing device may be used to examine user access rights to calendar information. If the user is not authorized to share calendar information, at stage 215, the computing device provides a registration wizard to the user for obtaining registration information from the user to allow the user to access personal and custom calendar information associated with the user.

If the user is authorized to share calendar information, the method 200 proceeds to stage 220 where the computing device receives calendar information from the user through one or more entry points. For example, an entry point may include a toggle button with a calendar, a context sensitive menu, a command well, and a calendar tab. Additional information received at stage 220 may include whether the user intends to use an online publishing service, for example, Microsoft Office Online, or utilize an existing web server, for example, a company owned Distributed Authoring and Versioning (DAV) web server that uses a hypertext transfer protocol (HTTP). Next, at stage 225, the computing device may receive calendar information settings that may be utilized when sharing the calendar information. The user may use the calendar information settings to override default settings for sharing calendar information.

Figure 3:
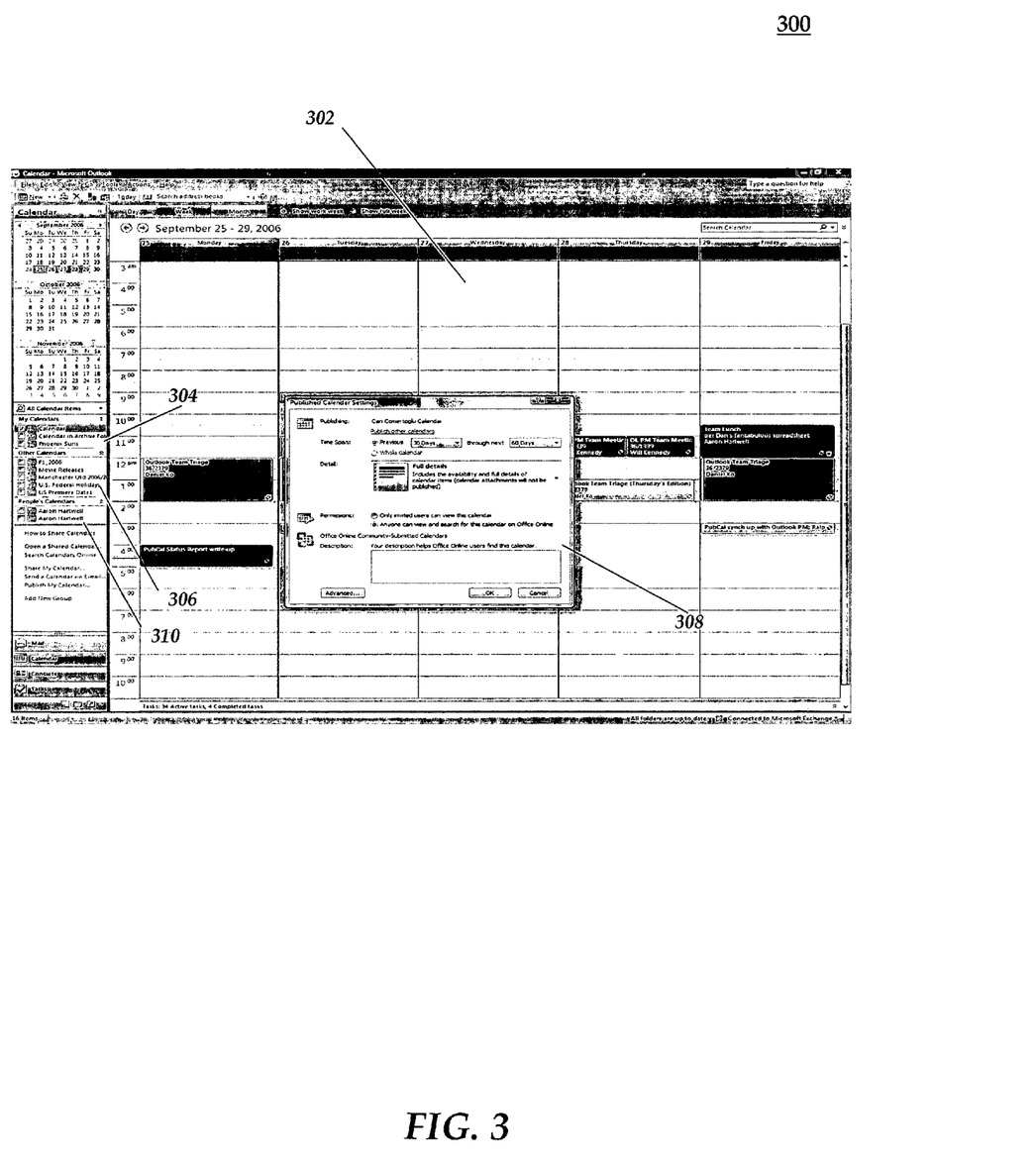
FIG. 3 is an exemplary screen shot illustrating a user interface for use with a computing device.

For example, a calendar information setting may include a setting a time span for calendar information that is shared, which is also further discussed with regard to FIG. 3. For example, the user may be conducting a business transaction that may span several weeks. During those several weeks the user may have to attend several meetings with coworkers and contacts outside the user's organization. Accordingly, the user may desire to share calendar information for the time span of the business transaction with those outside the user's organization, but not desire to share calendar information outside the business transaction time frame. Therefore, the user may set a time frame setting using a rolling time window to share calendar information for only the desired time frame, for example, 60 days, which is also further discussed with regard to FIG. 4.

Figure 5:
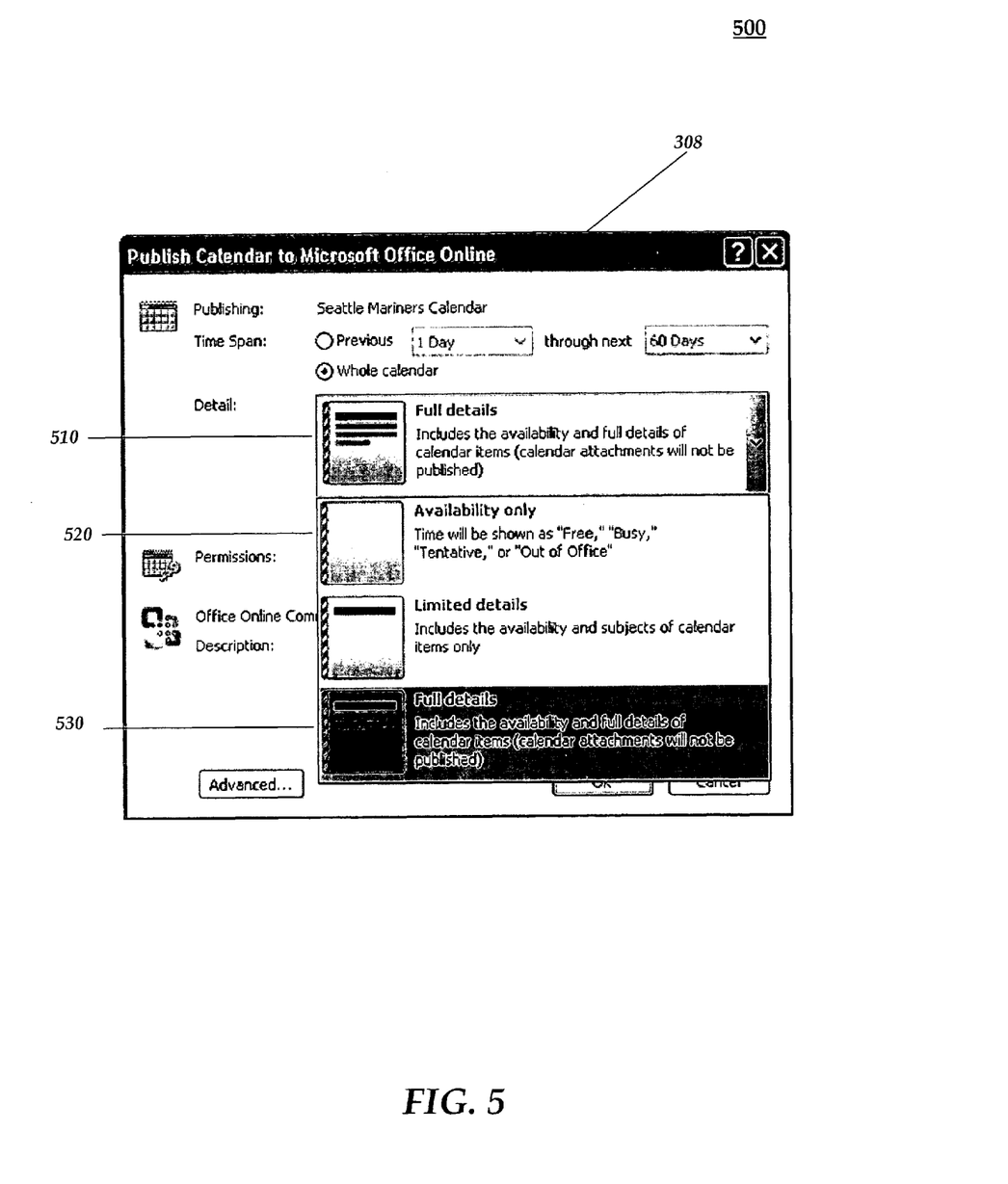
FIG. 5 is another exemplary screen shot illustrating the user interface for selecting calendar information settings for use with the computing device.

A calendar information setting may include a detail level, which is also further discussed with regard to FIG. 5. If the user desires to share all calendar information with others, the user may select, for example, a "full detail" setting. If the user desires to share some calendar information with others, the user may select, for example, a "limited detail" setting. If the user desires to merely share availability information with others, the user may select, for example, an "availability detail" setting.

Figure 6:
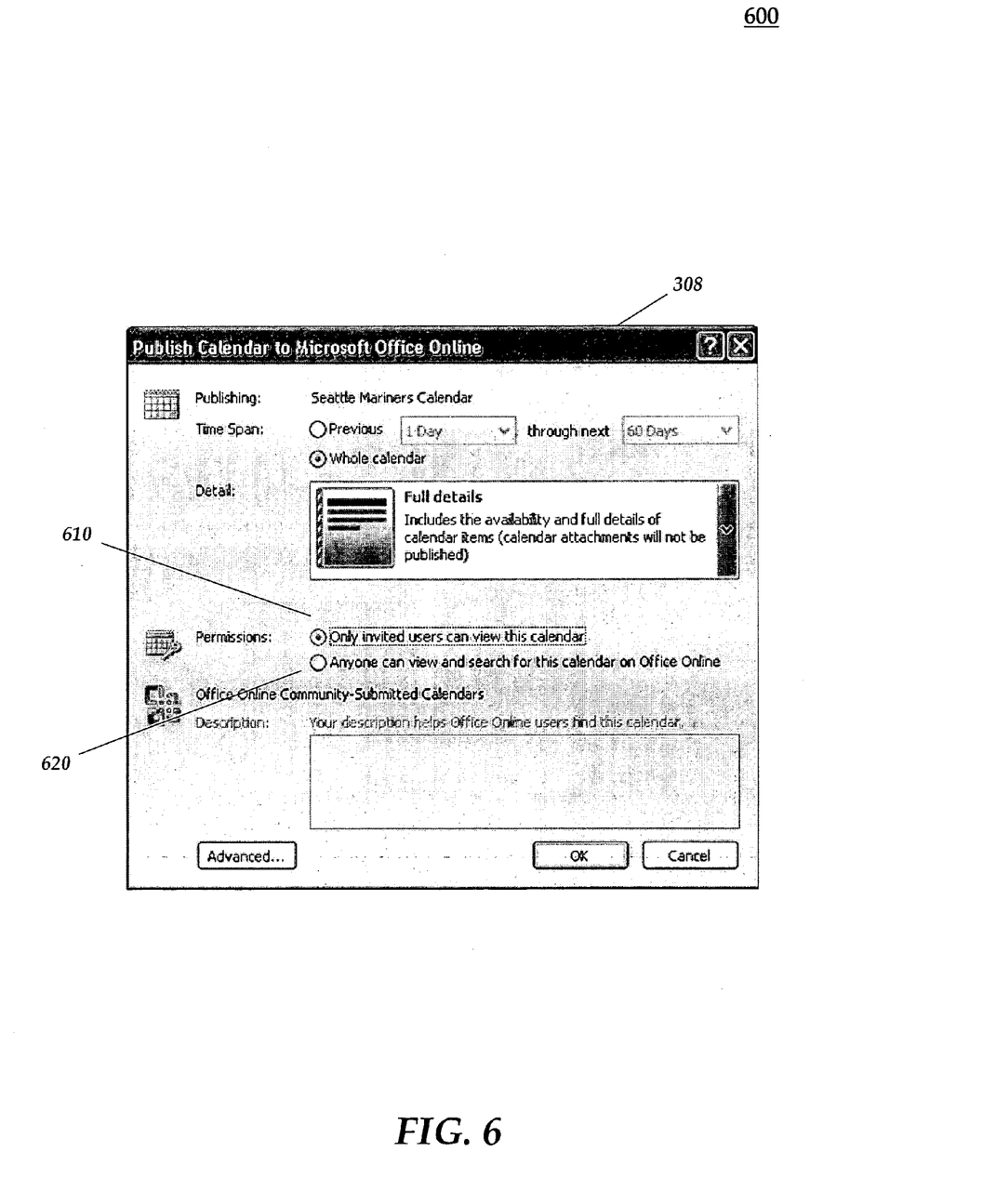
FIG. 6 is another exemplary screen shot illustrating the user interface for selecting calendar information settings for use with the computing device.

A calendar information setting may include a privacy setting, which is also further discussed with regard to FIG. 6. If the user desires to share calendar information with anyone that may have access to the online publishing service or DAV server, the user may set the privacy setting to public. If the user desires to share calendar information with only designated individuals that are invited to view the user's calendar information, the user may set the privacy setting to invitation only.

Figure 9:
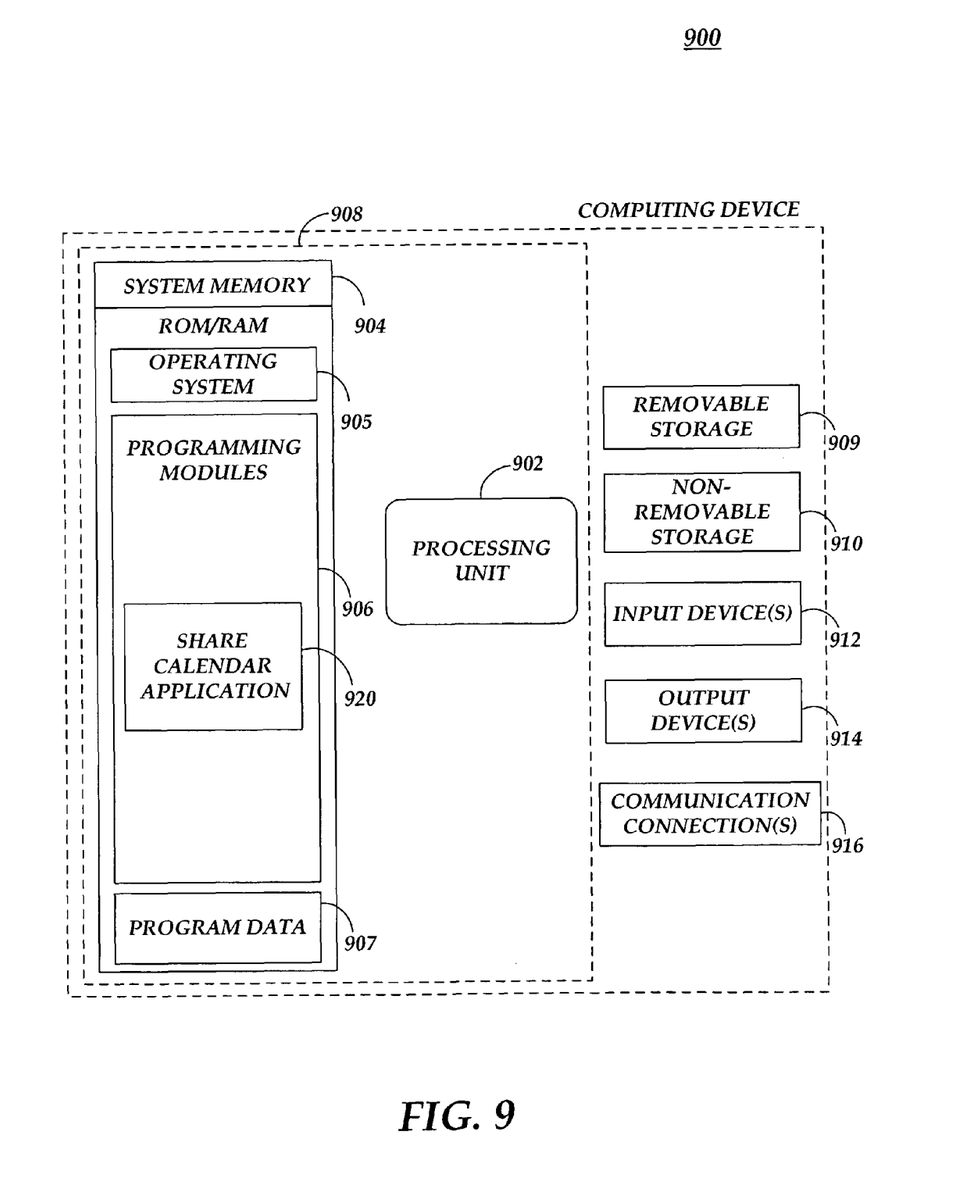
FIG. 9 is a block diagram of a system including a computing device for use in the networked operating environment of FIG. 1.

Next, at stage 230, the computing device may store the received calendar information and the received calendar information settings in variety of storage locations disclosed in FIGS. 1 and 9. Next at stage 235, the computing device publishes the received calendar information according to the received calendar information settings. The calendar information may be published for viewing using the Internet 125 and the online publishing service or the DAV web server. Subsequently, at stage 240, the computing device may provide access to the calendar information. If the privacy setting is set to public, all individuals that have access to the online publishing service if used by the user, or the DAV web server if used by the user, may view the user's published calendar information. If the privacy setting is set to private, only individuals designated by the user may view the published calendar information via the online publishing service. The DAV web server may allow individuals designated by the user may view the published calendar if the DAV web server is configured to be responsive to a privacy setting.

Next, at stage 245, the computing device may monitor the calendar information to determine if the calendar information has changed. For example, after publishing the calendar information, the user may have to unexpectedly travel within the time frame of the published calendar information, thereby changing the availability of the user. Accordingly, when the user changes the calendar information using, for example, Microsoft Outlook®, at stage 250, the published calendar information is automatically updated to reflect the changes entered by the user. The automatic update operates using an automated schedule to update the calendar information via any send/receive operations initiated by the user through Microsoft Outlook®. Next, the method 200 proceeds to stage 255. If the computing device determines that the calendar information has not changed, the method 200 proceeds to stage 255. At stage 255, the computing device determines if the user desires to continue publishing the calendar information. If the computing device determines that the user still desires to publish the calendar information, the method 200 returns to stage 245. If the computing device determines that the user does not desire to continue publishing the calendar information, at stage 260, the computing device removes the published calendar information using an un-publish setting. At stage 265, the method 230 ends.

FIG. 3 illustrates an exemplary calendar user interface 300 for a computing device of FIG. 1, according to one embodiment. A user may use calendar 302 to track activities and meetings. For example, calendar 302 may be associated with an electronic mail and scheduling application, such as Microsoft Outlook®. If the user desires to share calendar information with others, the user may utilize user interface 308 to enter calendar description information. The calendar name may be used to search for a particular calendar of interest, for example, the Seattle Seahawks footballs schedule for the 2006 season. In addition, the user may view and send personal and custom calendars by selecting a calendar from section 304. The user may view additional calendars by selecting a calendar from sections 306 and 310.

Figure 4:
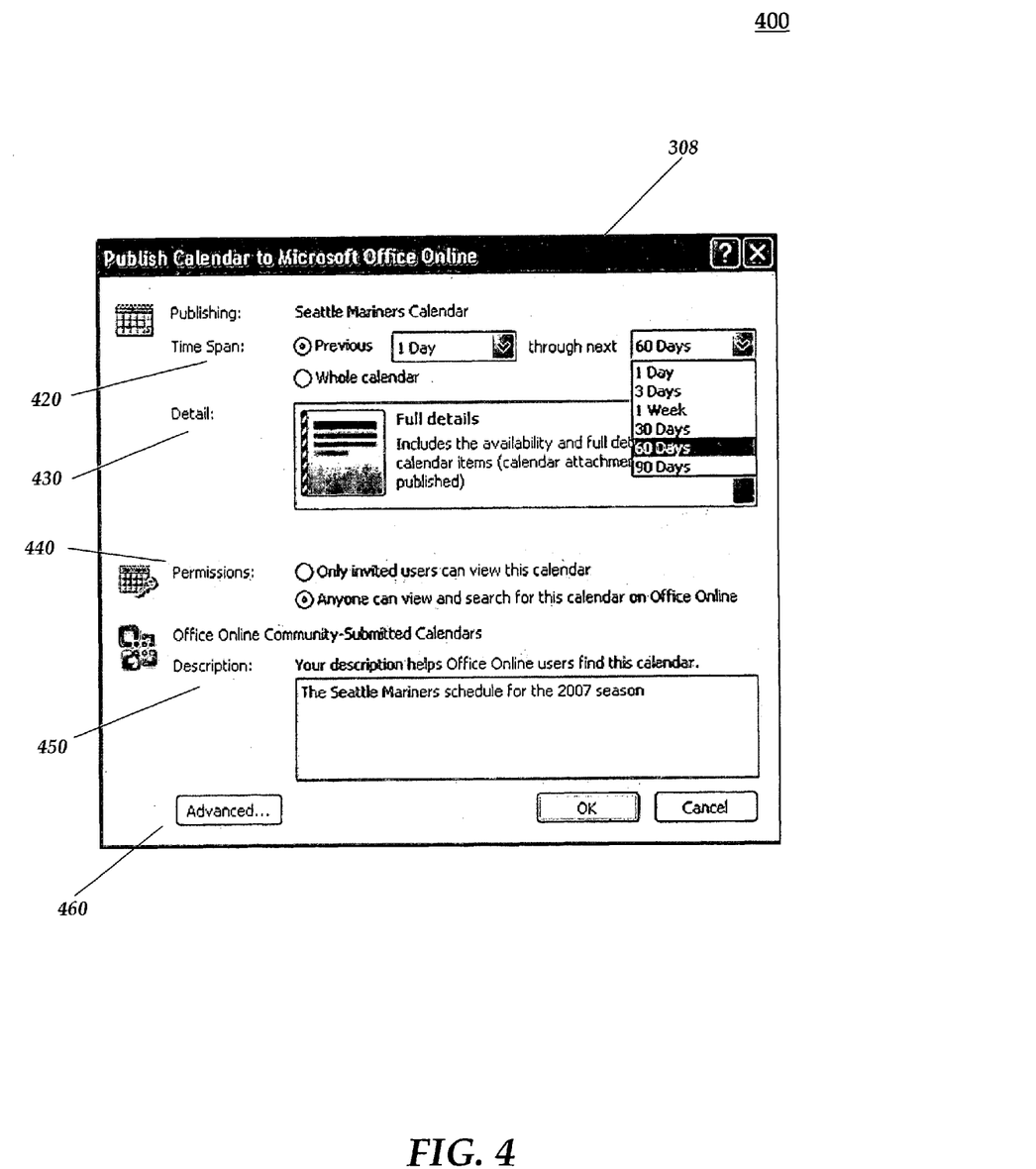
FIG. 4 is an exemplary screen shot illustrating a user interface for selecting calendar information settings for use with the computing device.

FIG. 4 illustrates user interface 308, according to one embodiment. The user interface 308 includes a time span selection setting 420, a calendar detail setting 430, a privacy setting 440, a calendar description setting 450, and advanced calendar settings 460, for example, upload methods, update frequency and the like. The user interface 308 may be used to set a rolling time window. The time span selection setting 420 permits a user to specify durations for which calendar information will be shared with others. An implied date range created by setting the durations shifts at a specified time, for example, midnight, which creates a rolling effect for the shared calendar. The rolling time window reduces the amount of calendar information because relevant calendar information associated with the selected time span is sent to a recipient instead of an entire calendar.

FIG. 5 illustrates user interface 308 during detail level selection, according to one embodiment. The user may use the calendar detail setting 330 to select how much calendar information will be shared with others. For example, is the user is sharing calendar information with others to coordinate a discrete task, the user may select the calendar detail setting 330, "availability only" 510 to indicate whether the user is "free," "busy," "tentative," or "out of the office". If the user is sharing calendar information internally or externally with subordinates, the user may select the calendar detail setting 330, "limited details" 520 to disclose limited details regarding the user's schedule. If the user is sharing calendar information internally or externally with superiors, the user may select the calendar detail setting 330, "full details" 530 to disclose all information regarding the user's schedule.

FIG. 6 illustrates user interface 308 during permissions selection, according to one embodiment. When a user publishes their calendar information to the Internet 125, the user may desire to restrict access to their published calendar information, for example, parents' calendar information for coordinating picking up their children. Accordingly, the user may select privacy selection 610 to allow invited individuals to view the published calendar information on the Internet 125. The user may desire to allow any individual with access to the Internet 125 to view their published calendar information, for example, the 2006 football schedule for the Seattle Seahawks. Accordingly, the user may select privacy selection 620 to allow anyone to view the published calendar information on the Internet 125.

Figure 7:
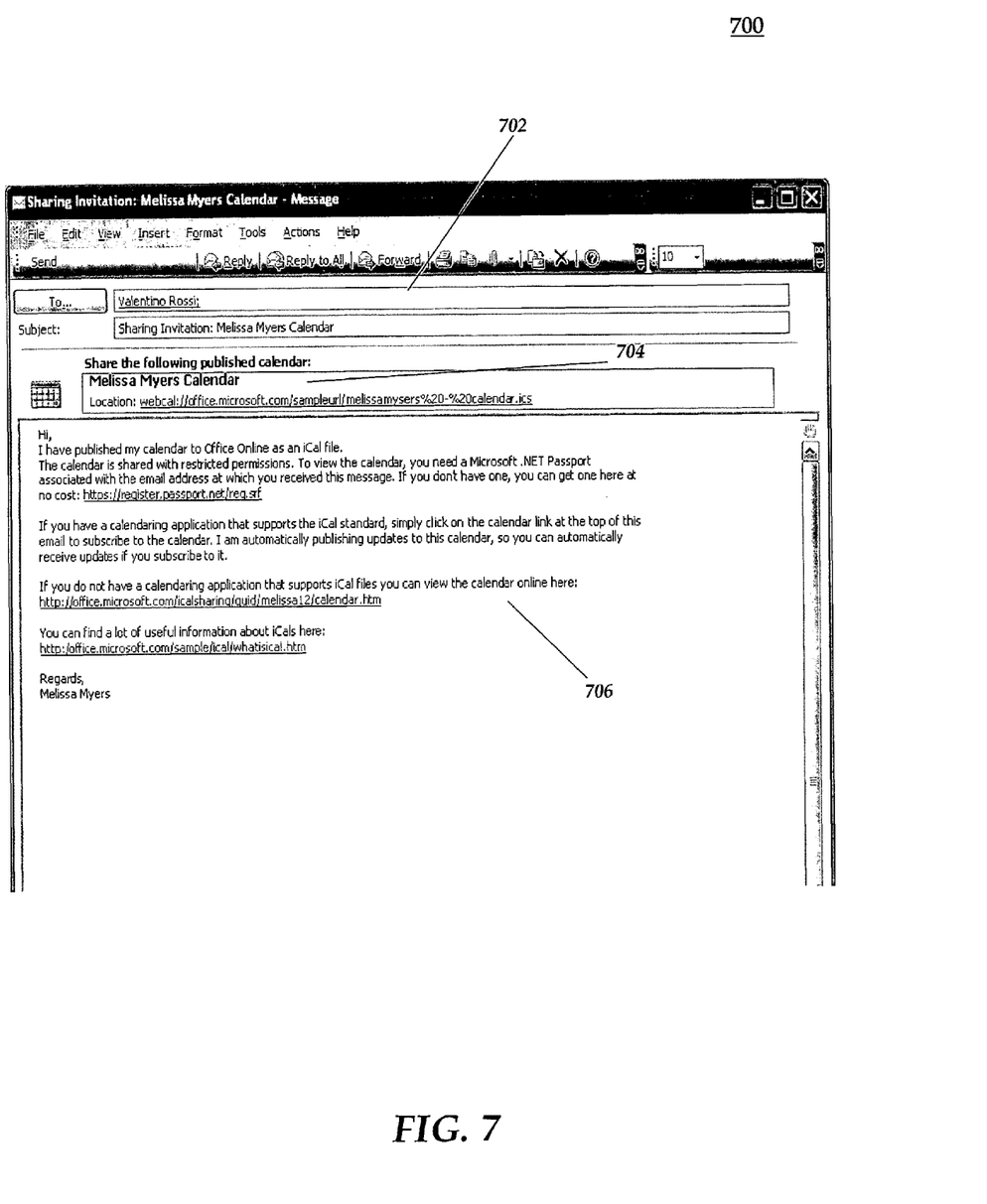
FIG. 7 is an exemplary screen shot illustrating an invitation to view calendar information for use with the computing device.

FIG. 7 illustrates an exemplary user interface 700 for providing access to published calendar information to others using a computing device of FIG. 1, according to one embodiment. If the user has set the privacy setting to private, when the user desires to share information with others, the computing device presents the users with a sharing invitation screen 702. Using the sharing invitation screen 702, the user may enter electronic mail addresses for calendar information recipients. The recipients may or may not be associated with a local exchange server used by the user. A calendar information link 704 is included in sharing invitation screen 702 to allow recipients to view the calendar information. An invitation message 706 is also included in sharing invitation screen 702 to provide the recipient with pertinent information regarding the user's calendar information.

Figure 8:
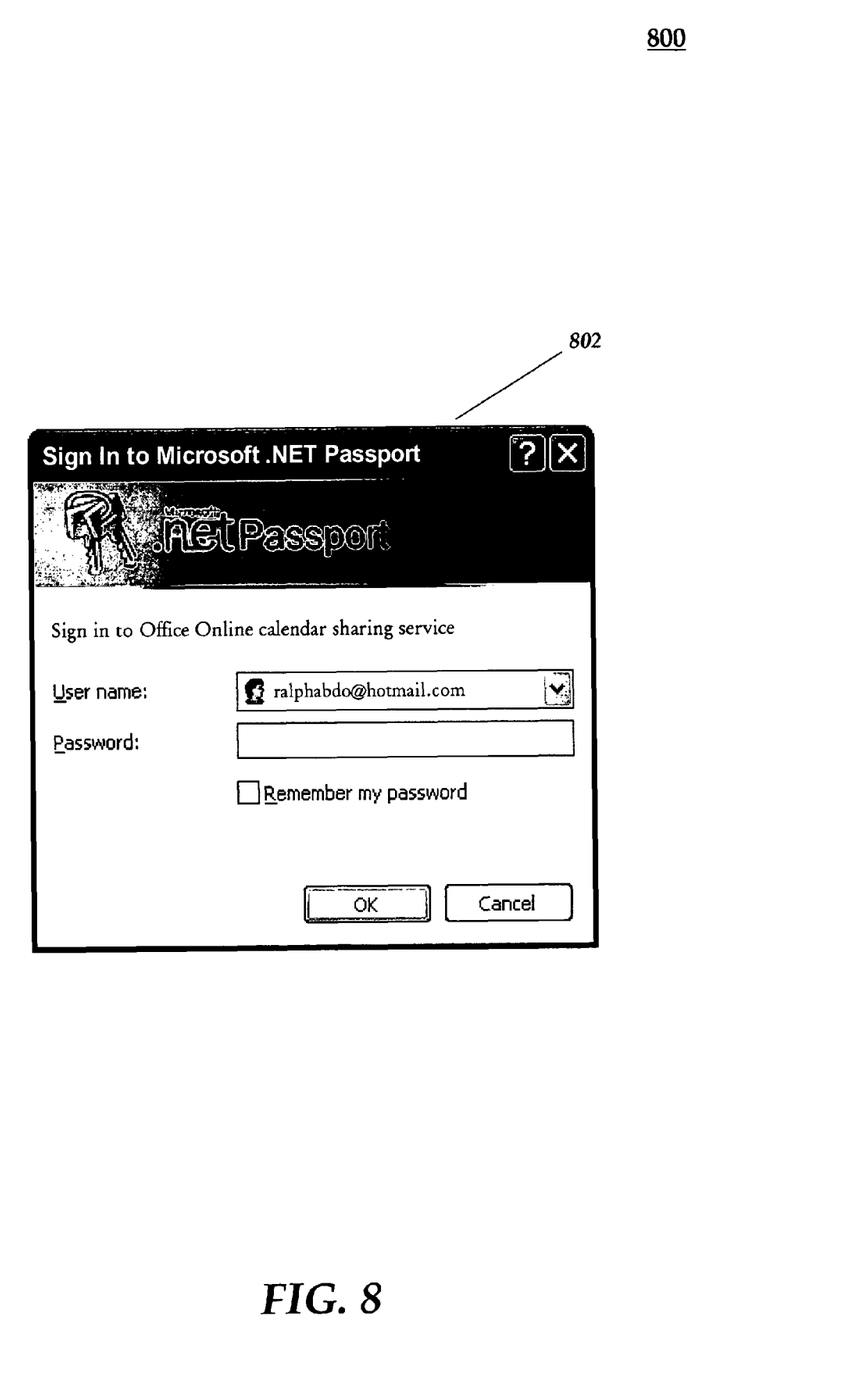
FIG. 8 is another exemplary screen shot illustrating a login user interface for use with the computing device.

FIG. 8 illustrates an exemplary login user interface 800 for authenticating user access rights with regard to sharing calendar information using a computing device of FIG. 1, according to one embodiment. The computing device may utilize authentication dialog 802. For example, authentication dialog 802 may be a web based authentication application. When the user is authenticated, the user may access and share calendar information created by the user. The computing device may provide additional security to prevent the user from sharing calendar information received from another user.

FIG. 9 is a block diagram of a system including a computing device 800, which may be used in conjunction with server (102 and 152), server (104 and 154), desktop computer (112 and 162), and laptop computer (114 and 164). Consistent with an embodiment of the invention, any suitable combination of hardware, software, or firmware may be used to implement a memory storage and processing unit. For example, the memory storage and processing unit may be implemented with the computing device 900 or any of the other computing devices in combination with the computing device 900. The aforementioned system, device, and processors are examples and other systems, devices, and processors may comprise the aforementioned memory storage and processing unit, consistent with embodiments of the invention. Furthermore, the computing device 900 may comprise an operating environment for an associated system. The system may operate in other environments and is not limited to computing device 900.

With reference to FIG. 9, a system consistent with an embodiment of the invention may include a computing device, such as computing device 900. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination. System memory 904 may include operating system 905, one or more programming modules 906, and may include a program data 907. Operating system 905, for example, may be suitable for controlling computing device 900's operation. In one embodiment, programming modules 906 may include a document creation application for creating and editing a document. Programming modules 906 may include a calendar sharing application 920 for sharing calendar information with others. Furthermore, embodiments of the invention may be practiced in conjunction with a graphics library, other operating systems, or any other application program and is not limited to any particular application or system. This basic configuration is illustrated in FIG. 9 by those components within a dashed line 808.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and nonvolatile, removable and non-removable media implemented in any method or technology for storage of information, such as computer readable instructions, data structures, program modules, or other data. System memory 904, removable storage 909, and non-removable storage 910 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also employ input device(s) 912 such as a keyboard, a mouse, a pen, a sound input device, a touch input device, etc. Output device(s) 914 such as a display, speakers, a printer, etc. may also be included. The aforementioned devices are examples and others may be used.

Computing device 900 may also contain a communication connection 916 that may allow device 900 to communicate with other computing devices, such as over network 110 in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 904, including operating system 905. While executing on processing unit 902, programming modules 906 may perform processes including, for example, one or more method 200's stages as described below. The aforementioned process is an example, and processing unit 902 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Consistent with embodiments of the present invention, calendar information is shared from an electronic mail and scheduling application in a standard calendaring format that may be understood by any other calendaring application or website that reads an Internet calendar format. Accordingly, calendar information may be shared with others that may or may not be associated with a local exchange server used by the user thereby reducing security risks because calendar information recipients outside the local exchange server do not have access to the local exchange server, but may still coordinate scheduling with those inside the local exchange server. Also, an organization that allows sharing calendar information may also restrict users from publishing calendar information to the Internet, may require the user to only publish calendar using a private setting, i.e., by invitation only, or disable sharing calendar information altogether.

A user may publish the calendar information explicitly, or according to a user defined schedule. If the user has scheduled a "send/receive" for the published calendar information, then a scheduler associated with an electronic mail and scheduling application will trigger computer code every N minutes to publish the calendar information to the Internet. The computer code may also perform the function of determining if the user has chosen to respect a default publishing frequency for publishing the calendar information, or if the user will use a user defined publishing frequency. The computer code may also perform the function of determining if publishing the calendar information should cease because the calendar information has been removed. The computer code may also perform the function of determining whether the calendar information has been changed, locally or on an exchange server, since the calendar information was last published, or whether a date boundary has been crossed, which would cause the rolling window to adjust. The computer code may also perform the function of exporting the calendar information into an uploadable file, and determining if the uploadable file is identical to a previously published uploadable file.

In addition, the user may publish calendar information on the Internet and maintain online communities in which subscribers coordinate scheduling by receiving calendar information from the user when the subscriber subscribes to the online community. For example, the user may establish a community for a particular online game, for example, World of Warcraft. Accordingly, individuals may subscribe to an online community created by the user, and may coordinate activities using the published calendar information.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/ or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for sharing calendar information, the method comprising:

determining whether a sender is authorized to send calendar information to another by examining registration rights associated with the sender, wherein examining registration rights associated with the sender uses an authentication process;

upon determining that the registration rights associated with the sender are valid, receiving input from the sender associated with sending the calendar information to the another using one of a plurality of entry points, the plurality of entry points comprising a calendar toggle button and a calendar tab;

receiving calendar information settings from the sender;

publishing the calendar information on the Internet based on the calendar information settings;

sharing a portion of the published calendar information by providing access, to only a transaction, from among a plurality of transactions, in the calendar information to the another, wherein the access is provided by setting a time frame limit for the portion of the published calendar information using a rolling time window, the rolling time window comprising a plurality of specified durations during which access to the transaction in the calendar information is provided to the another, wherein an implied date range created by the plurality of durations shifts at a specified time to create a rolling effect for a shared calendar comprising the calendar information; and setting a detail level for controlling an amount of the calendar information published to the Internet.

2. The method of claim 1, wherein the published calendar information is associated with one or more online communities.

3. The method of claim 1, wherein a portion of the calendar information is published on the Internet.

4. The method of claim 1 further comprising updating the published calendar information when the calendar information changes.

5. The method of claim 1, wherein the update is automatic.

6. The method of claim 5, wherein the update occurs in response to a send/receive operation.

7. The method of claim 1 further comprising providing subscription based viewing of the published calendar information.

8. The method of claim 1, wherein a user can search for calendar information associated with one or more calendars using a search engine.

9. A system for sharing calendar information, the system comprising:
   a memory comprising a data storage device for storing calendar information, wherein the memory is searchable;
   a processing unit coupled to the memory storage, wherein the processing unit is operative to:
      determine whether a sender is authorized to send calendar information to another by examining registration rights associated with the sender, wherein examining registration rights associated with the sender uses an authentication process;
      upon determining that the registration rights associated with the sender are valid, receive input from the sender associated with sending the calendar information to the another using one of a plurality of entry points, the plurality of entry points comprising a calendar toggle button and a calendar tab;
      receive calendar information settings from the sender;
      publish the calendar information on the Internet based on the criteria;
      share a portion of the published calendar information by providing access, to only a transaction, from among a plurality of transactions, in the calendar information to the another, wherein the access is provided by setting a time frame limit for the portion of the published calendar information using a rolling time window, the rolling time window comprising a plurality of specified durations during which access to the transaction in the calendar information is provided to the another, wherein an implied date range created by the plurality of durations shifts at a specified time to create a rolling effect for a shared calendar comprising the calendar information; and
      set a detail level for controlling an amount of the calendar information published to the Internet.

10. The system of claim 9, wherein the processing unit is associated with a server that supports a hypertext transfer protocol (http).

11. The system of claim 9, wherein the published calendar information is associated with one or more online communities.

12. The system of claim 9 further comprising using a search engine to search the memory storage, wherein the search engine searches for calendar information using search criteria associated with the calendar information.

13. The system of claim 12, wherein the memory storage stores calendar information associated with a plurality of calendars.

14. A memory device which stores a set of instructions which when executed performs a method for sharing calendar information, the method executed by the set of instructions comprising:
   determining whether a sender is authorized to send calendar information to another by examining registration rights associated with the sender, wherein examining registration rights associated with the sender uses an authentication process;
   upon determining that the registration rights associated with the sender are valid, receiving input from the sender associated with sending the calendar information to the another using one of a plurality of entry points, the plurality of entry points comprising a calendar toggle button and a calendar tab;
   receiving calendar information settings from the sender;
   publishing the calendar information on the Internet based on the criteria; and
   sharing a portion of the published calendar information by providing access, to only a transaction, from among a plurality of transactions, in the calendar information to the another, wherein the access is provided by setting a time frame limit for the portion of the published calendar information using a rolling time window, the rolling time window comprising a plurality of specified durations during which access to the transaction in the calendar information is provided to the another, wherein an implied date range created by the plurality of durations shifts at a specified time to create a rolling effect for a shared calendar comprising the calendar information; and
   setting a detail level for controlling an amount of the calendar information published to the Internet.

* * * * *